United States Patent [19]

Onoe et al.

[11] Patent Number: 5,361,396
[45] Date of Patent: Nov. 1, 1994

[54] LOCATION REGISTRATION SYSTEM IN MOBILE COMMUNICATION

[75] Inventors: Seizo Onoe; Narumi Umeda; Hidemi Yamaguti; Syuji Yasuda, all of Kanagawa, Japan

[73] Assignees: Nippon Telegraph and Telephone Corp.; NTT Mobile Communications Network Inc., both of Tokyo, Japan

[21] Appl. No.: 117,879

[22] Filed: Sep. 7, 1993

Related U.S. Application Data

[63] Continuation of Ser. No. 757,729, Sep. 11, 1991, abandoned.

[30] Foreign Application Priority Data

Sep. 14, 1990 [JP] Japan .................................. 2-244575

[51] Int. Cl.$^5$ ............................................. H04Q 7/04
[52] U.S. Cl. .................................. 455/33.4; 455/56.1; 379/59
[58] Field of Search ................... 455/33.1, 33.4, 33.2, 455/53.1, 54.1, 56.1, 38.4; 340/825.47; 379/59, 60

[56] References Cited

U.S. PATENT DOCUMENTS 4,131,881 12/1978 Robinson ...................... 340/825.47
5,101,500 3/1992 Marui ............................. 455/38.4
5,212,822 5/1993 Fukumine et al. ............... 455/56.1

OTHER PUBLICATIONS

Location Registration Procedures GSM recommendation GSM-0312 (released on Apr. 15, 1989).

Primary Examiner—Reinhard J. Eisenzopf
Assistant Examiner—Philip J. Sobutka
Attorney, Agent, or Firm—Martin Novack

[57] ABSTRACT

In a mobile communication system in which the service area is covered with a plurality of location registration areas each having a plurality of cells each relating to a specific base station, each location registration area has a plurality of groups so that the cells belonging to any group overlaps partly with the cells of other groups, but do not completely coincide with cells of other groups, and each mobile station belongs to one of said groups. When a mobile station moves beyond the border of location registration areas, the location updating for the mobile station is carried out at the cell in which the mobile station stays. In that case, as the mobile stations are classified into a plurality of groups, the traffic in each cell for location updating is dispersed to many cells, and the maximum traffic density for location updating per cell is reduced. So, the number of control channels in the system for location updating may be reduced.

8 Claims, 12 Drawing Sheets

Fig. 3

| NUMBER N OF GROUPS (N=4) | |
|---|---|
| LOCATION CODE FOR GROUP 1 | L1 |
| LOCATION CODE FOR GROUP 2 | L2 |
| LOCATION CODE FOR GROUP 3 | L3 |
| LOCATION CODE FOR GROUP 4 | L4 |

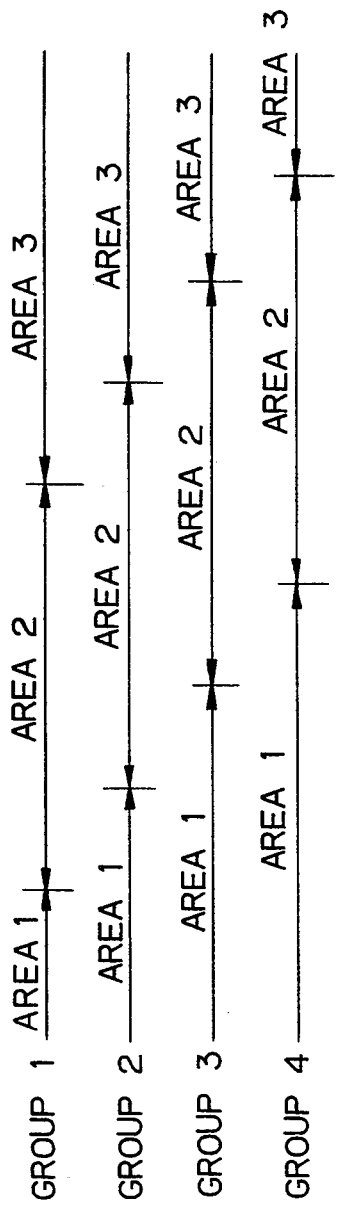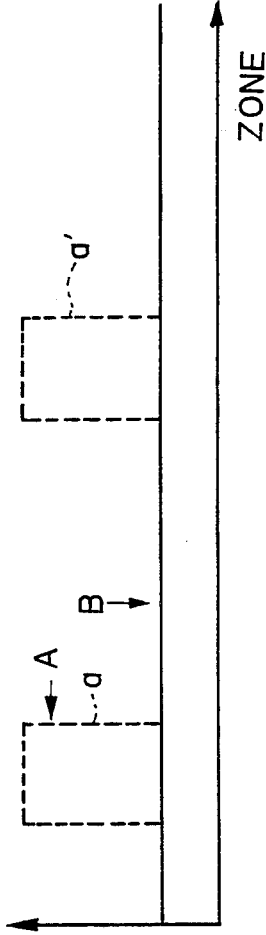
Fig. 4A
Fig. 4B
Fig. 4C
Fig. 4D
Fig. 4E
Fig. 4F
Fig. 4G

Fig. 5

| LOCATION CODE | GROUP NUMBER | ZONES FOR PAGING |
|---|---|---|
| 1 | 1 | 1,2,3 |
| 1 | 2 | 1,2,3,4,5 |
| 1 | 3 | 1,2,3,4,5,6,7 |
| 1 | 4 | 2,3,4,5,6,7,8,9 |
| 2 | 1 | 4,5,6,7,8,9,10,11 |
| 2 | 2 | 6,7,8,9,10,11,12,13 |
| 2 | 3 | 8,9,10,11,12,13,14,15 |
| 2 | 4 | 10,11,12,13,14,15,16,17 |
| 3 | 1 | 12,13,14,15,16,17,18 |
| 3 | 2 | 14,15,16,17,18 |
| 3 | 3 | 16,17,18 |
| 3 | 4 | 18 |

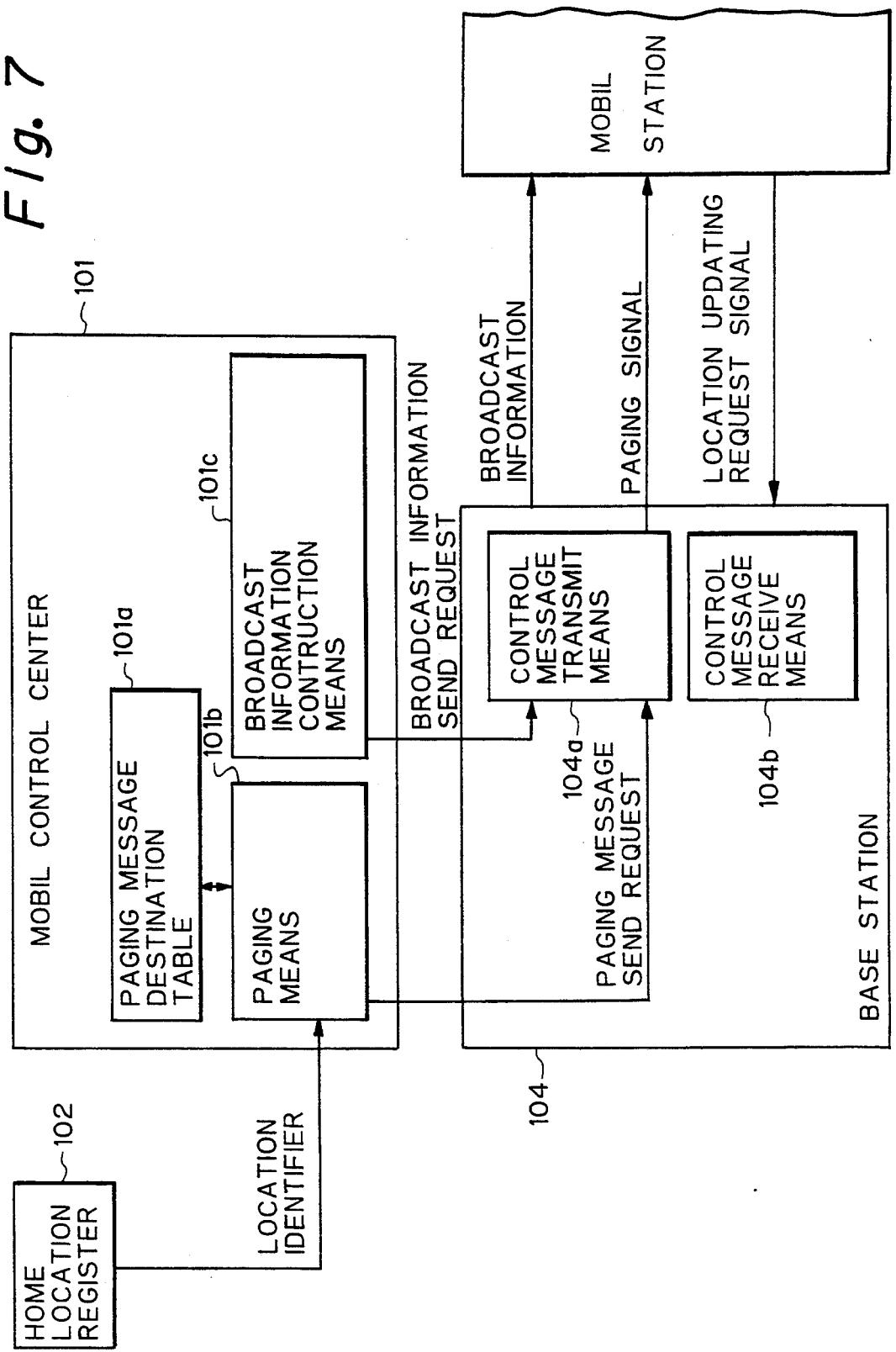

Fig. 9A

| DESTINATION ADDRESS (ALL MS) | ORIGINATING ADDRESS (BS ID) | MESSAGE TYPE (BROADCAST INFORMATION MESSAGE) | MISCELLANEOUS | NUMBER OF GROUPING | 1ST' GROUP LOCATION IDENTIFIER | ----- | n'TH GROUP LOCATION IDENTIFIER | MISCELLANEOUS |

BROADCAST INFORMATION MESSAGE

Fig. 9B

| DESTINATION ADDRESS (BS ID) | ORIGINATING ADDRESS (MS ID) | MESSAGE TYPE (LOCATION UPDATING REQUEST MESSAGE) |

LOCATION UPDATING REQUEST MESSAGE (1)

Fig. 9C

| DESTINATION ADDRESS (BS ID) | ORIGINATING ADDRESS (MS ID) | MESSAGE TYPE (LOCATION UPDATING REQUEST MESSAGE) | LOCATION IDENTIFIER |

LOCATION UPDATING REQUEST MESSAGE (2)

Fig. 9D

| DESTINATION ADDRESS (MS ID) | ORIGINATING ADDRESS (BS ID) | MESSAGE TYPE (PAGING MESSAGE) |

PAGING MESSAGE

Fig. 10

| NUMBER OF OVERLAPS N1 | NUMBER OF GROUPS N2 |
|---|---|
| LOCATION CODE OF GROUP 1 | L11 |
| LOCATION CODE OF GROUP 1 | L12 |
| LOCATION CODE OF GROUP 2 | L21 |
| LOCATION CODE OF GROUP 2 | L22 |

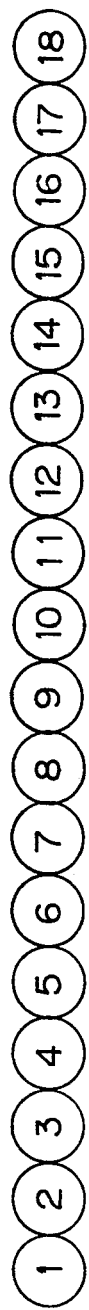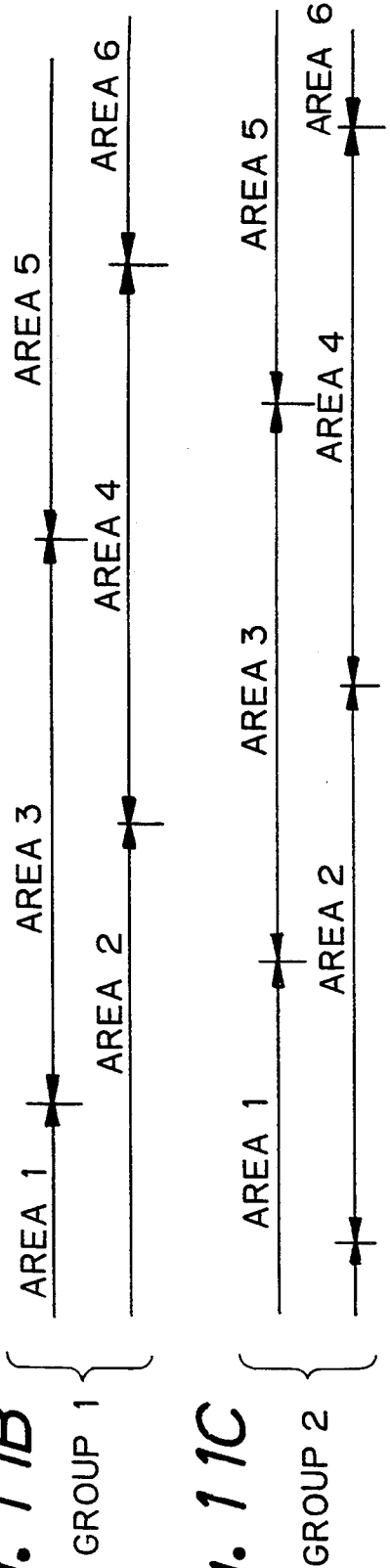
Fig. 11A
Fig. 11B GROUP 1
Fig. 11C GROUP 2
Fig. 11D

LOCATION REGISTRATION SYSTEM IN MOBILE COMMUNICATION

This is a continuation of U.S. Application Ser. No. 757,729, filed Sep. 11, 1991, now abandoned.

BACKGROUND OF THE INVENTION

The present invention relates to a location updating system in a mobile communication system and, in particular, relates to such a system in which a paging area where a mobile station is located is registered in a fixed network.

In a cellular mobile communication system, the service area for mobile communication is covered with a plurality of location registration areas, and each of the location registration area has a plurality of zones each of which has a base station having a transceiver.

When a mobile station moves beyond the border of a location registration area, the location code or the location identifier of the mobile station is updated so that the updated code relates to the location registration area where the mobile station is currently registered. The location updating operation is carried out through the broadcast information by a fixed network. The fixed network has a home memory which has information about which location registration area each mobile station is currently registered in.

When a fixed network calls a mobile station, the fixed network transmits a paging signal to a mobile station through a plurality of base stations which belong to a location registration area where the mobile station is currently registered, so that the connection with the mobile station is established.

Conventionally, the structure of a location registration area has been common for all the mobile stations. In such system, when subscriber density increases, and each cell becomes smaller, the traffic for location updating control occupies a large fraction in a control channel, and it becomes larger than the traffic for connection control.

Conventionally, the size of a location registration area has been determined so that the ratio of the location updating traffic at the zone at the peripheral of the location registration area and the paging traffic for connection control is optimized.

However, when a location registration area is determined, a zone except a peripheral zone in a location registration area must have almost the same number of control channels as that in a peripheral zone, because of downstream paging channel, in spite of surplus upstream channels for location updating.

Therefore, prior art which has a common location registration area has the disadvantages that the frequency band is not used effectively, and that a large number of transceivers for control channels must be installed.

SUMMARY OF THE INVENTION

It is an object, therefore, of the present invention to overcome the disadvantages and limitations of a prior location registration system by providing a new and improved location registration system in mobile communication.

It is also an object of the present invention to provide location registration system in which upstream traffic in a control channel balances with downstream traffic in a control channel.

It is also an object of the present invention to reduce traffic density for location updating in particular zones.

The above and other objects are attained by a location registration system in a mobile communication system comprising; a service area for mobile communication comprising a plurality of location registration areas each having a plurality of zones, and each zone being related to a related base station; a fixed home memory station storing location code of each mobile station showing which location registration area each mobile station is currently registered in; a fixed mobile control center coupled with said home memory station, a fixed telephone network, and a plurality of base stations each of which transmits radio wave to mobile stations currently registered in a related zone; a plurality of mobile stations coupled with one of the base stations through radio link, and having a location code corresponding to the same in said home memory station; said location code in said home memory station and in said mobile station being updated when the mobile station moves beyond border of location registration areas, to the location code of the location registration area in which the mobile station is currently registered; a call from a fixed network to a mobile station being transmitted from the base stations which belong to the location registration area which the mobile station is currently registered, to the mobile stations; wherein each location registration area has a plurality of groups each having a plurality of zones so that the zones of any group overlap partly with the zones of other groups, but do not completely coincide with zones of other groups; each mobile station belongs to one of said groups; broadcast information from a base station to mobile stations for location updating includes a number of groups, and a plurality of location codes for each group; means for updating location code is provided so that when a location code in a mobile station does not coincide with any one of the location codes for the group to which the mobile station belongs in broadcast information, location codes are updated in said home memory station and the mobile station; fixed network stores a paging table which lists a plurality of zones for each group for each location code, and paging information for call to a mobile station is transmitted by the base stations which are listed in the related group of the location registration area in said table.

BRIEF DESCRIPTION OF THE DRAWINGS

The foregoing and other objects, features, and attendant advantages of the present invention will be appreciated as the same become better understood by means of the following description and accompanying drawings wherein;

FIG. 3 shows an embodiment of a configuration of a broadcast message for location updating according to the present invention, FIGS. 4A–G the configuration of a location registration area of the present invention, FIG. 5 shows a paging table of zones for paging, FIG. 7 is a block diagram of a base station and a mobile control center, FIGS. 8A & B shows operational flowcharts of a mobile station and a fixed network, FIGS. 9A-D shows signal formats used in the present invention, FIG. 10 shows a configuration of a broadcast message for updating in the second embodiment according to the present invention, and FIGS. 11A-D shows a configuration of a location registration area in the second embodiment of the present invention.

DESCRIPTION OF THE PREFERRED EMBODIMENTS

Figure 1:
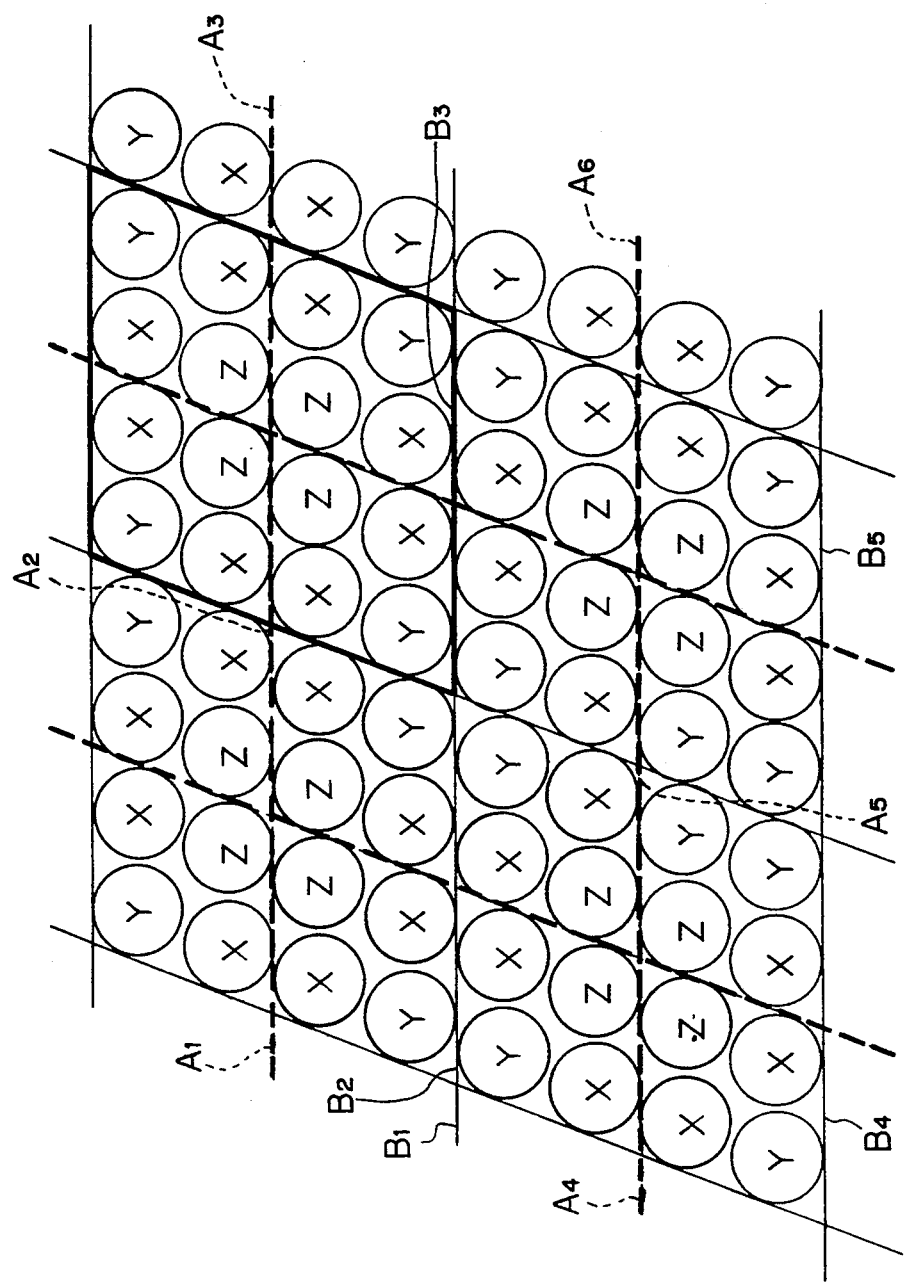
FIG. 1 shows a map of location registration areas according to the present invention.

FIG. 1 shows a service area of a mobile communication system according to the present invention, and shows the basic concept of the present invention.

According to the present invention, a service area for mobile communication is divided into a plurality of location registration areas ($A_1$, $A_2$, $A_3$, ..., $B_1$, $B_2$, $B_3$, ...). The location registration areas are classified into a first group ($A_1$, $A_2$, $A_3$ et al) each of which is enclosed by a dotted line, and a second group ($B_1$, $B_2$, $B_3$, et al) each of which is enclosed by a solid line. Each of a first group of location registration areas overlaps partly with a second group of the same number of a location registration area. That is to say, $A_i$ overlaps with $B_i$ partly. In the embodiment the location registration areas are classified into two groups $A_i$ and $B_i$ where i is an integer showing a location registration area number.

Each location registration area ($A_i$, $B_i$) has a plurality of radio zones (X,Y,Z) each of which relates to a specific base station which is coupled with a mobile station through radio link. In the embodiment, each location registration area has 16 zones.

Mobile stations are classified into the groups corresponding to the groups of the location registration areas. So, in the embodiment, the mobile stations are classified into one of first group and second group.

A location code which shows which location registration area in which a mobile station stays is kept both in a home memory station in a fixed network, and a mobile station. The location code is updated when a mobile station moves beyond the border of the location registration areas of the group which the mobile station belongs.

In the embodiment of FIG. 1, the location updating for first group of mobile stations ($A_i$) is carried out when a mobile station moves beyond the dotted line in the figure. In other words, said location code updating is carried out in the base stations indicated by X or Z. Similarly, the location code updating for second group mobile stations ($B_i$) is carried out when the mobile station moves beyond the solid line in the base stations indicated by X or Y.

In the prior art, no classification of mobile stations is used, and assuming that all the mobile stations belong to the first group $A_1$, the location code updating for all the mobile stations is carried out in the zones indicated by X and Z, which are at the border of location registration areas, and therefore, the traffic for location code updating in those zones must be high. On the other hand, according to the present invention, the traffic for location code updating is distributed to many zones, and therefore, the traffic density in each zone for location code updating is lower than that of the prior art.

So, it should be appreciated that the classification of mobile stations into a plurality of groups, and the classification of the location registration areas into groups so that each group of location registration area overlap partly with other group of location registration area are important concepts of the present invention.

The group number of each mobile station may be either fixed for each mobile station, or adaptively determined in each location registration area. In the latter case, the group number of a mobile station is calculated by the modulo of an identification number or a telephone number of a mobile station, and a number of groups.

Figure 2:
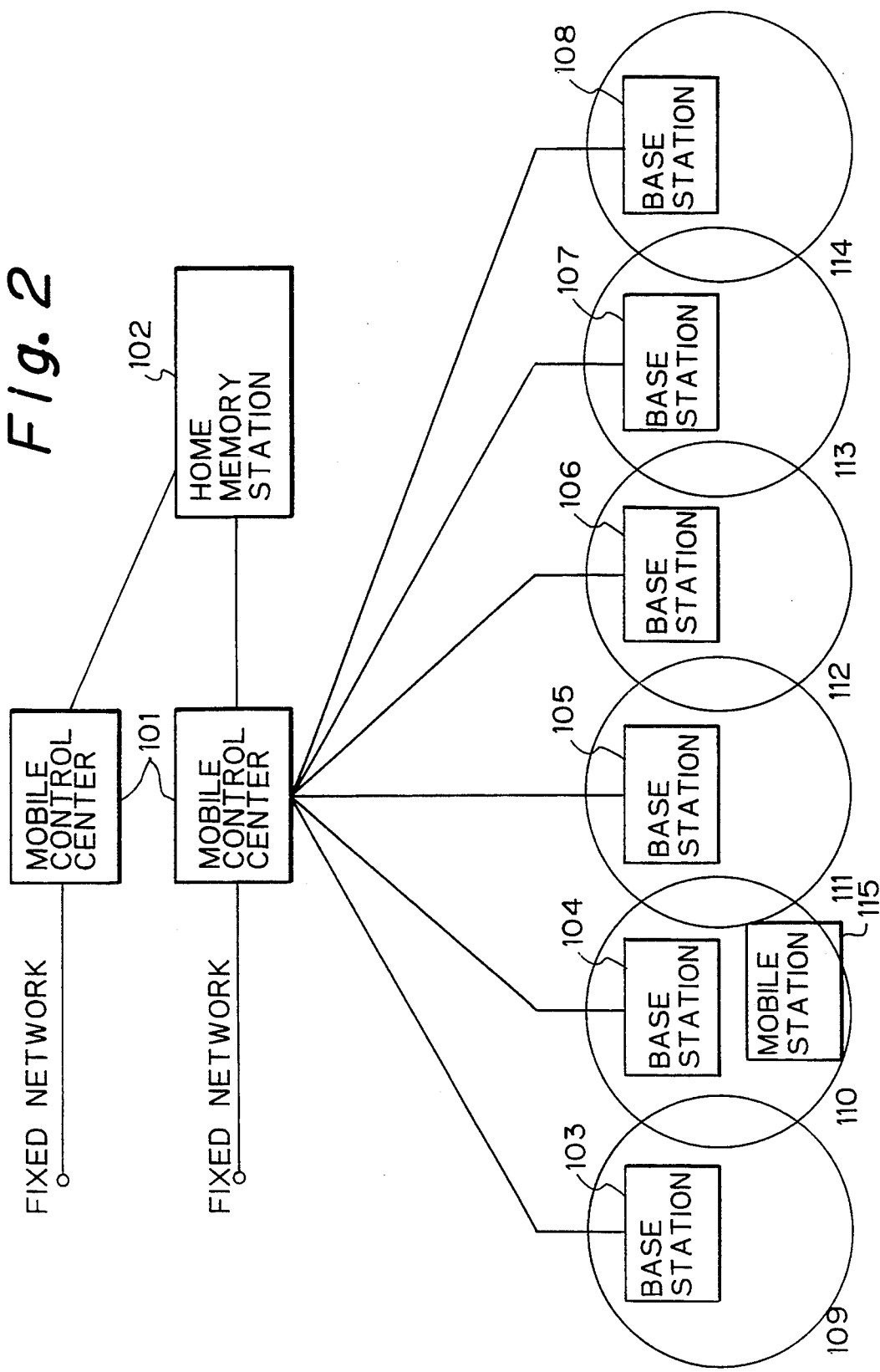
FIG. 2 is a system block diagram of a mobile communication system according to the present invention.

FIG. 2 shows a mobile communication system according to the present invention. In the figure, it is assumed that a mobile control center 101 controls a plurality of base stations 103-108. In the embodiment, the mobile control center 101 controls the base stations 103-108, each of which covers one of zones 109-114. It is assumed that a mobile station 115 stays in the zone of the base station 104.

The base station 104 which includes a mobile station 115 broadcasts a location updating code. When the location updating code received by the mobile station changes because of the movement of the mobile station to another zone, the location updating is carried out. In operation, the mobile station 115 forwards the base station 104 a location updating request signal, which is forwarded to the home memory station or the home location register 102 through the base station 104 and the mobile control center 101. The home memory station 102 updates the location code or the location identifier of the mobile station in its memory.

When a fixed network has a call to a mobile station, the network recognizes the location registration area in which the mobile station is currently registered in the location code stored in the home memory station 102. Then all the base stations in that location registration area transmit the paging signal for call to mobile stations. Upon response by the mobile station 115, the radio zone in which the mobile station is currently registered is determined, and the connection control between the mobile station and the fixed network is carried out. In the embodiment, the radio zone 110 is selected.

FIG. 3 shows the content of the broadcast information for location updating in the present embodiment. It is assumed in the embodiment that the number of grouping for location registration is determined in the fixed network.

The mobile station operates in the waiting state or non-active state is as follows. It is assumed that the mobile station stores the specific identification number for grouping. Upon receiving the broadcast information from the base station 104, the mobile station 115 calculates the group number by using the number of grouping in the broadcast information, and said identification number. For instance, the group number is modulo or remainder of said identification number and said number of grouping. When the number of grouping is 4, the group number is 0, 1, 2 or 3. Said identification number of a mobile station may be a telephone number of a mobile station.

An identification number is not restricted to a telephone number, but a specific number which is obtained by processing all or a part of the telephone number is possible.

Upon calculation of the group number, the mobile station compares the code (L1 through L4) at one of the location codes in the broadcast information with the code which is stored in the mobile station itself. For instance, when the mobile station belongs to the second group, said mobile station obtains the group number 2 by taking the modulo of the mobile station identification number and the number of groups (=4). And, the mobile station stores the location code L2. The mobile station compares the location code L2 stored in the mobile station itself with the second code in the broadcase information. If the mobile station stays in the location registration area L2, those codes coincide with each other.

When the location code stored in the mobile station does not coincide with the code relating to the group of the mobile station in the broadcast information, it means that the mobile station moved beyond the border of the location registration areas, therefore, the mobile station forwards the location updating request signal to the base station, and carries out the location updating control, and stores the updated location identifier in the memory of the mobile station.

The location registration control in the base station side is carried out similarly. When no location diode is included in a location updating request signal, the group number of a mobile station is calculated as is the case in a mobile station, and selects the location code in a plurality of location codes in the base station 104, and has the home memory in the home memory station 102 store that location code.

When location code is included in a location updating request signal, no above calculation is necessary.

The paging in the base station 104 is carried out as follows. First, the control center 101 accesses the home memory in the home memory station 102 to obtain the location code and the identification number of the mobile station 115. If the identification number is able to be calculated by using the telephone number, it is not necessary to store the identification number in the home memory. In that case, the group number of the mobile station 115 is calculated by using the identification number as is the case in the mobile station, and the location registration area in which the mobile station stays is determined by the group number and the location code, and therefore, the base stations belonging to that location registration area transmit the paging signal.

FIG. 4 shows the embodiment of the location registration area and the grouping according to the present invention. In the figure, A shows the arrangement of radio zones. When a part of a location code in each groups coincides with another location code, some omission is possible. For instance, the broadcast information in FIG. 4F for the zone (=2,2,2,2) is the same as that for the zone 11, and in that case, the number of groups in those zones may be 1 in, and only one location code in those zones is available.

The symbols B, C, D and E in FIG. 4 show the location registration area as shown in FIG. 3. FIG. 4B shows the location registration area for the group 1 which the area 1 has the zones 1-3, the area 2 has the zones 4-11, the area 3 has the zones 12-18. FIG. 4C shows the location registration area for the group 2, in which the area 1 has the zones 1-5, the area 2 has the zones 6-13, the area 3 has the zones 14-18. FIG. 4D shows the location registration area for the group 3, and FIG. 4E shows the location registration area for the group 4. FIG. 4G shows the necessary number of radio channels in each zone. When a mobile station in FIG. 2 moves from left to right, the necessary number of channels in the present invention is almost flat in all the zones, as shown by the curve B in FIG. 4G, while that necessary number of channels in a prior art is high in the zones 3 and 4, and the zones 11 and 12, as shown by the curve A in FIG. 4G.

The mobile stations belonging to the group 1 carry out the location updating at the zone 4 and the zone 12 (see FIG. 4A), when they move from left to right in FIG. 2, since they change the location registration area as shown in FIG. 4B. The mobile stations belonging to the group 2 carry out the location updating in the zone 6 and the zone 14 as shown in FIG. 4C. The mobile stations belonging to the group 3 carry out the location updating in the zone 8 and the zone 16 as shown in FIG. 4D. The mobile stations belonging to the group 4 carry out the location updating in the zone 10 and the zone 18 as shown in FIG. 4E. Therefore, according to the present invention, the zones in which the location updating is carried out are distributed to all the zones.

On the other hand, in prior art in which all the mobile stations belong to the group 1, the location updating is carried out only in the zones 4 and 12 (see FIG. 4B) when the mobile stations move from left to right, and in the zones 3 and 11 when the mobile stations move from right to left, and therefore, the location updating density in those zones is very high as shown in FIG. 4G.

Next, the zones for paging are described. Those zones are simply determined by the mobile control center 101 (FIG. 2) which has a paging table of the relationship between a location code and a group number, and the zones for paging. FIG. 5 shows an example of that table for paging. The content of FIG. 5 coincides with the embodiment of FIG. 3.

When the location code of the mobile stations is 2 (which is stored in the home memory 102), the paging for the group 1 mobile stations is carried out through the base stations 4-11. The paging for the group 2 mobile stations is carried out through the base stations 6-13. The paging for the group 3 mobile stations is carried out through the base stations 8-15, and the paging for the group 4 mobile stations is carried out through the base stations 10-17.

As a modification, when a mobile control center, and/or a base station has a plurality of nodes, each node may have a related table for determining zones for paging. Further, when a location registration area belongs to a plurality of mobile control centers, one of the control centers may have a table, and the content of which is transferred to other centers.

The location updating traffic in the present invention is distributed to all the zones as shown in FIG. 4G, and therefore, the number of control channels may be small. In FIG. 4G, a and a' show the necessary number of channels in prior art in which all the mobile stations belong to the group 1. The location updating traffic in a prior art is concentrated in the zones 3, 4, 11 and 12. Other zones have less traffic as those zones may have only control channels for call connection, which is less than location updating. Therefore, if a large number of control channels are assigned in the particular zones in the prior art, the frequency efficiency is considerably low.

On the other hand, the necessary number of control channels in the present invention is only $\frac{1}{4}$ of that of the prior art, when the number of groupings is 4. In particular, when a paging channel and other connection control channel are allocated on uplink and downlink of a control channel, the effect of the present invention is high. As the downlink channel including the paging channel has small throughput per channel as the common information is sent in a lot of cells, and the uplink channel using random access for connection control has less throughput than the channel, when the paging channel and the other connection control channel are included in a common control channel, it is possible to balance the capacity of the uplink channel and the downlink channel and to use transceivers effeciently.

As for a modification for a group number, it is possible to fix a group number, and store the same in a mobile station and a home memory in a network. Alternatively, said group number can be adaptive, and a network may advise the updated group number to a mobile station.

Figure 6A:
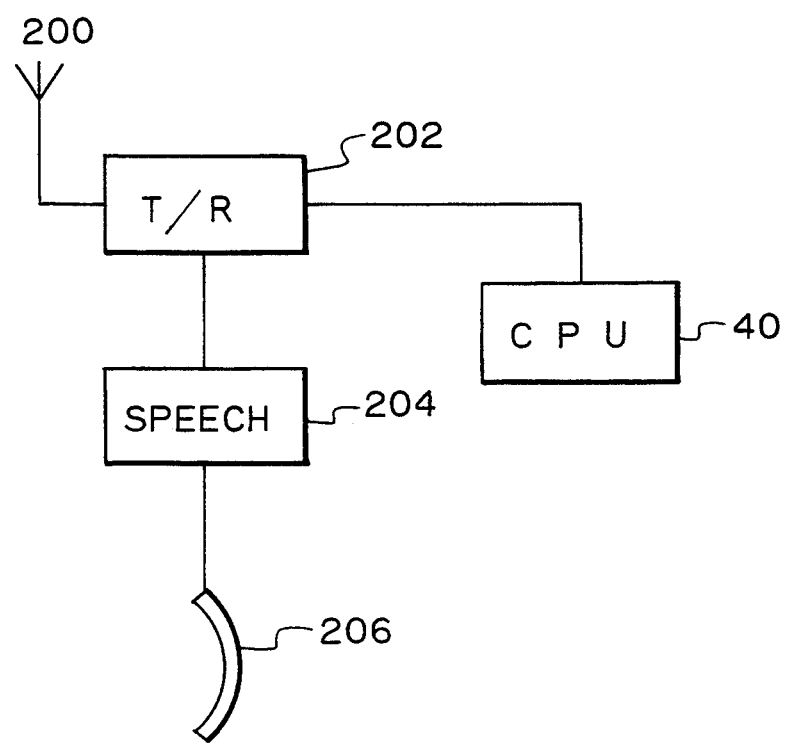
FIG. 6A is a block diagram of a mobile station.

FIG. 6A is a block diagram of a mobile station, in which 200 is an antenna, 202 is a transceiver having a transmitter and a receiver, 204 is a speech circuit, 206 is a handset having a microphone and a receiver, and 40 is a control circuit having a programmed computer.

Figure 6B:
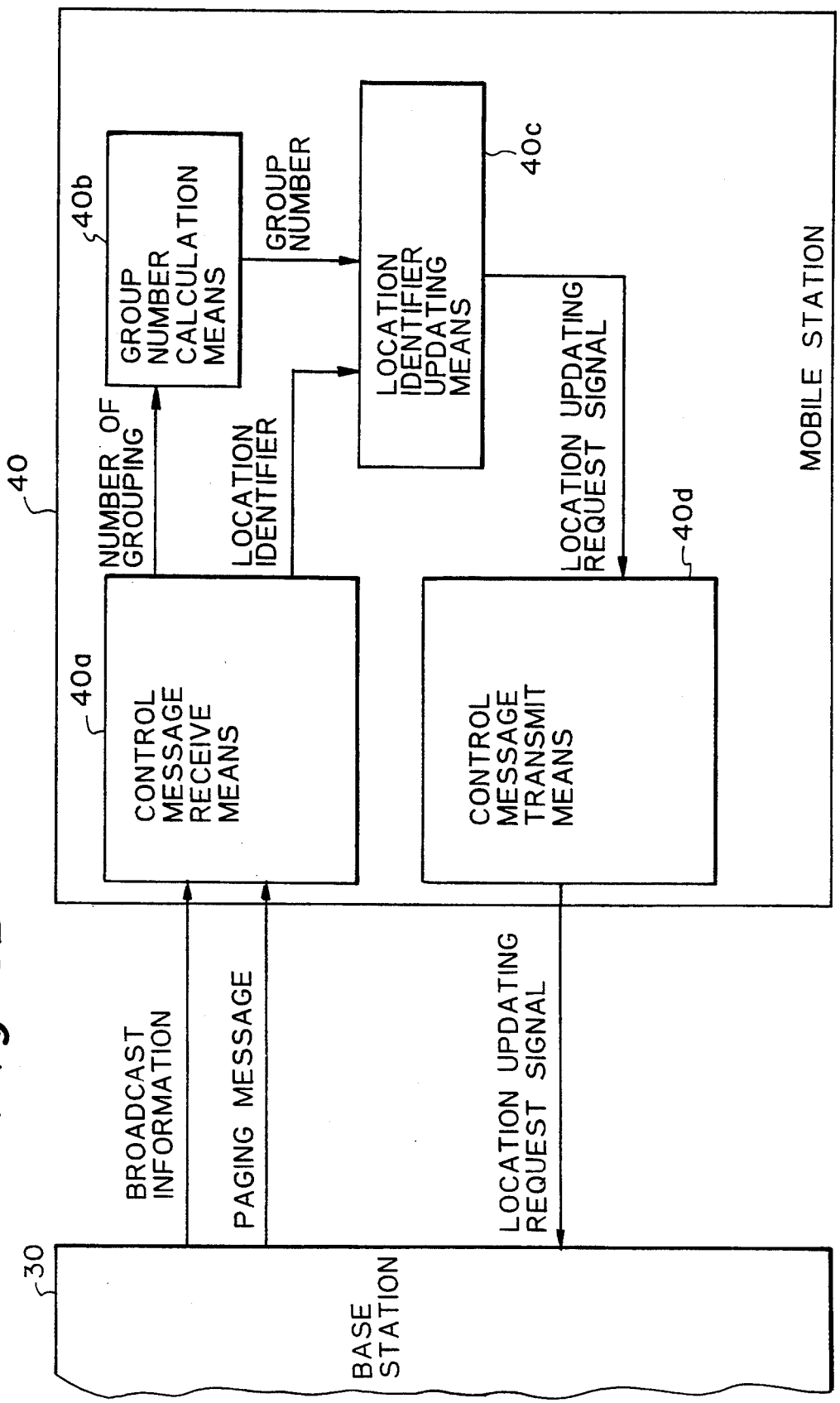
FIG. 6B is a block diagram of a control means 40 in FIG. 6A.

FIG. 6B shows a block diagram of a control circuit 40 in FIG. 6A. Concerning control signals according to the present invention, a base station 30 forwards a mobile station a broadcast information message which includes number of grouping, and location identifiers for each group, and a paging message to page a called mobile station. The control circuit 40 in a mobile station has a control message receive means 40a for the receiving broadcast information message and the paging message, a group number calculation means 40b coupled with output of said control message receive means 40a for deriving a group number in broadcast information. The location identifier updating means 40c checks if the location identifier sent by the base station coincides with the location identifier stored in the mobile station. If those codes do not coincide with each other, it indicates that the mobile station has moved beyond the border of the location registration areas, and therefore, the mobile station forwards a location updating request signal to a base station through the control message transmit means 40d.

FIG. 7 shows a block diagram of a base station 104, and a mobile control center 101. A mobile control center 101 is coupled with a home memory station or a home location register 102, and derives a location identifier or a location code which shows which location registration area in which a mobile station is currently registered.

The mobile control center 101 has a paging message destination table 101a (FIG. 5), which is coupled with a paging means 101b. The paging means 101b provides a paging message send request signal, which is transmitted to a mobile station through a control message transmit means 104a in the base station 104. The mobile control center 101 has also a broadcast information construction means 101c, which edits a broadcast information, which is forwarded to a mobile station through the control message transmit means 104a in the base station 104. The base station 104 has also a control message receive means 104b, for receiving a location updating request signal from a mobile station.

As one of the modifications, a broadcast information construction means which is installed in the mobile control center may be installed in a base station.

Figure 8A:
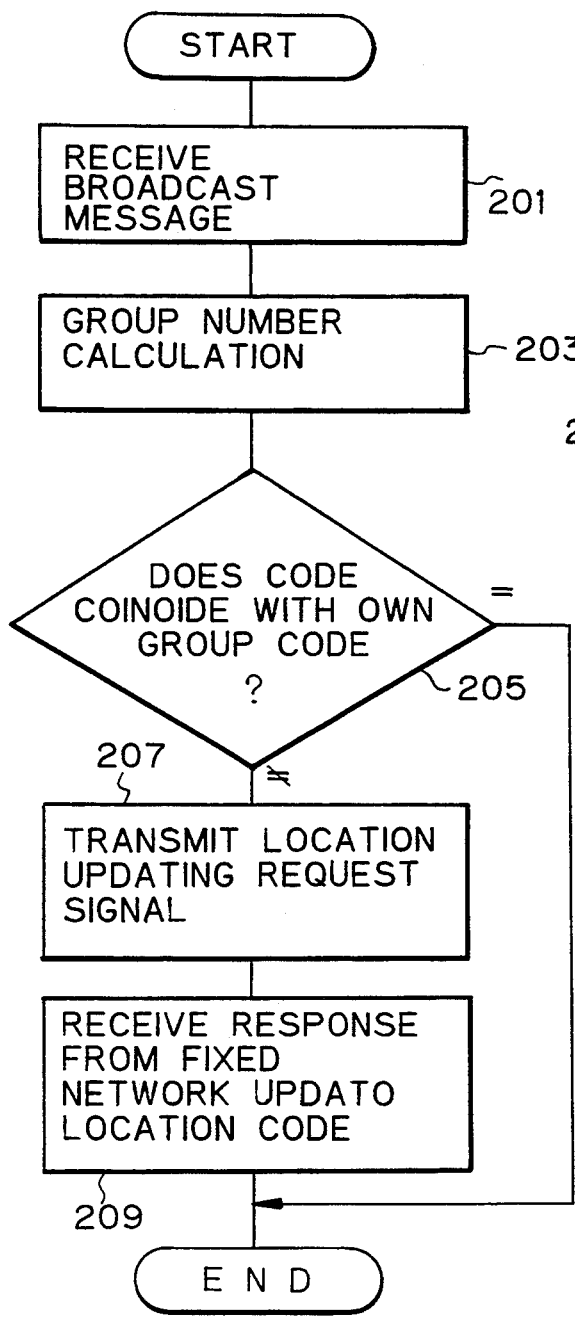
Figure 8B:
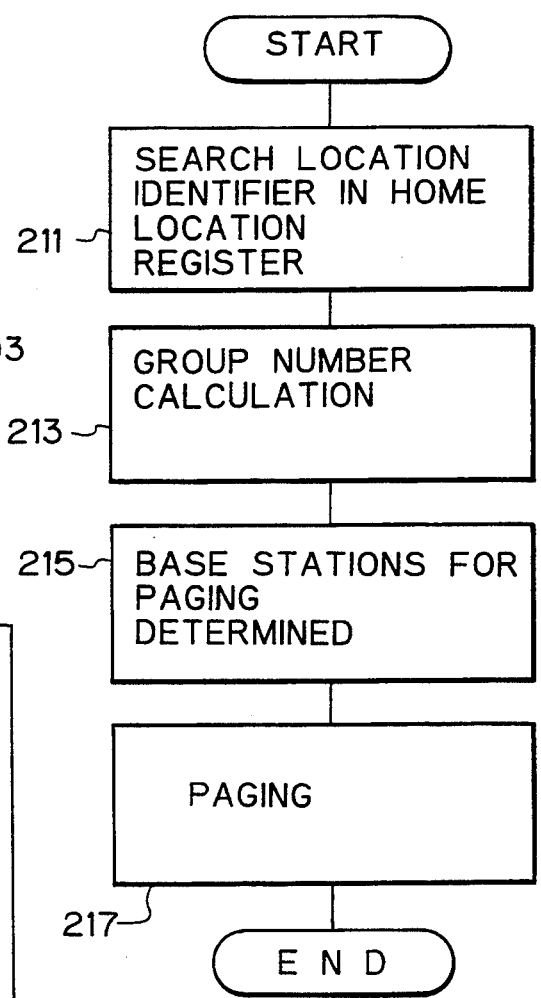

FIG. 8 shows operational flowcharts in a mobile station (a) for location updating request, and in a fixed network (b) for paging.

In FIG. 8(a), when a mobile station receives a broadcast message (201), it calculates a group number (203) by taking modulo of a telephone number and a number of groups. Then, the mobile station compares the location code stored in the mobile station itself with the location code in the time slot of the own group number in the broadcast information (205). If two codes coincide with each other, no updating operation is carried out, and the operation ends. If two codes do not coincide, a location updating request signal is transmitted (207) from a mobile station to a base station. And, the mobile station receives the response from the fixed network, and updates the location code where the mobile station stays.

When a fixed network carries out a paging, a location identifier or a location code for a called mobile station is searched in a home location register (211). Then, a group number of a mobile station is calculated (213) by taking modulo of a telephone number of the mobile station and the number of groups. Next, the base stations which should transmit paging signals are determined according to the table in FIG. 5 which is installed either in a base station or in a mobile control center (215). Then, the base stations thus determined transmit paging signals (217).

FIG. 9 shows some embodiments of signal format used in the present invention.

FIG. 9A shows a signal format of a broadcast message which is transmitted from a base station to a mobile station. In the figure, it has a destination address field Which is idle in this case, an originating address field (base station identifier) which has an address of a base station, a message type field which shows that the signal is a broadcast information message, a miscellaneous field, a number of grouping field which shows the number of grouping (it is 4 in the embodiment of FIG. 3), a plurality of location identifier areas for each groups, and a miscellaneous field.

FIG. 9B shows an embodiment of a location updating request message, which is sent from a mobile station to a base station. It has a destination address which is an address of a base station, an originating address field (mobile station identifier) which is an address or a telephone number of a mobile station, and a message type field which shows that the signal is a location updating request signal.

FIG. 9C shows an alternative of a location updating request message. The difference of FIG. 9C from FIG. 9B is that the signal format of FIG. 9C has a location identifier field, which shows the location registration code to be updated. That location identifier is taken in the group location identifier in the broadcast message. So, the location identifier in FIG. 9C is mere copy of the own location identifier in the broadcast message.

FIG. 9D shows a signal format of a paging signal which is sent from a base station to a mobile station. It has a mobile station identifier (mobile station identifier) showing a telephone number of a called mobile station, a base station identifier field (base station identifier), and a message type field which shows that the signal is a paging message.

It is assumed in the above embodiment that a location registration area does not overlap with an adjacent location registration area in the same group. As a modification, a location registration area may partly overlap with an adjacent location registration area in the same group. In that case, frequent location updatings are avoided when a mobile station stays close to the border of location registration areas. That idea for overlapping location registration areas is shown in Japanese patent application 227598/1989.

The second embodiment of the present invention in which a location registration area overlaps with an adjacent location registration area in the same group, location registration areas are classified into groups, and mobile stations are classified into said groups, is now described.

FIG. 10 shows the second embodiment of the present invention, in which it is assumed that the number of overlapping registration areas is 2, and the number of groups of mobile stations is 2. A mobile station calculates the group number g (g=1 or 2) as is the case of the first embodiment, and reads the location codes Lg1 and Lg2 which belong to the same group as the own mobile station. When the location code $L_0$ stored in the mobile station does not coincide with Lg1 nor Lg2, the location updating is carried out, and the updated location code Lg1 is stored.

FIG. 11 shows the location registration area in the second embodiment according to the present invention. FIG. 11A shows the arrangement of the radio zones, FIG. 11B shows the location registration area for the group 1, FIG. 11C shows the location registration area for the group 2, and FIG. 11D shows the broadcast information in each zones. As shown in FIG. 11D, the location code from a base station to a mobile station is an even number at the border of odd areas, and is an odd number at the border of even areas. In FIG. 11D, a mobile station which belongs to the group 1 monitors the location code at L11 and L12 (see FIG. 10), and when the location code stored in the mobile station does not coincide with L11 nor L12, the location code in the mobile station is updated to L11.

When a mobile station which is registered to the area 3 is located in the zone 8, and the station moves in the right direction in the figure, the group 1 station carries out the location updating at the zone 12 (see FIG. 11B). Then, when that mobile station comes back in the left direction in the figure, the location updating is carried out at the zone 7 (see FIG. 11B), but not zone 11.

Next, it is assumed that a group 2 mobile station registered in the area 3 is located in the zone 8. When the mobile station moves in the right direction, the location updating is carried out at the zone 14 (see FIG. 11C). Thus, the combination of the present invention with the location registration system which overlaps location registration areas provides the further improvements of avoiding the concentration of location updating traffic.

From the foregoing it will now be apparent that a new and improved location registration system has been found. It should be understood of course that the embodiments disclosed are merely illustrative and are not intended to limit the scope of the invention. Reference should be made to the appended claims, therefore, rather than the specification as indicating the scope of the invention.

What is claimed is:

1. A location registration system in a mobile communication system comprising:
    a service area for mobile communication comprising a plurality of location registration areas each having a plurality of cells, the area for each cell being related to a respective base station,
    a fixed home location register storing a location identifier of each mobile station showing which location registration area each mobile station is currently registered in,
    a fixed mobile control center coupled with said home location register, a fixed telephone network, and a plurality of base stations each of which transmits radio wave to mobile stations which are currently registered in a related cell,
    a plurality of mobile stations coupled with one of the base stations through radio link, and having a location identifier corresponding to the same in said home location register,
    said location identifier in said home location register and in said mobile station being updated when the mobile station moves beyond the border of location registration areas, to the location identifier of the location registration area in which the mobile station is currently registered,
    a call from a fixed network to a mobile station being transmitted from the base stations which belong to the location registration area in which the mobile station is currently registered, to the mobile stations, CHARACTERIZED IN THAT
    the mobile stations are divided into a plurality of groups, each mobile station being associated with only one group,
    each location registration area has associated with it a plurality of base stations,
    each said group is associated with a plurality of location registration areas, and the location registration areas of one group partially overlap with the areas of the groups, wherein some base stations belong to a plurality of location registration areas, but each base station is associated with only one location registration area per group,
    the base stations broadcast location updating information to a plurality of groups of mobile stations, including location identifiers for each respective group,
    means for updating location identifiers is provided so that when a location identifier in a mobile station does not coincide with any one of the broadcast information location identifiers for the group to which the mobile station belongs, location identifiers are updated in said home location register and the mobile station, and
    a fixed network stores a paging table which lists a plurality of cells for each group for each location identifier, and paging information for a call to a mobile station is transmitted by the base stations listed in the related group of the location registration area in said table.

2. A location registration system according to claim 1, wherein each mobile station belongs to one of the groups adaptively, and the group which the mobile station belongs is determined by calculation of modulo of an identification number of the mobile station and a number of groups which is informed to the mobile station through boradcast information.

3. A location registration system according to claim 1, wherein each mobile station belongs to a fixed group.

4. A location registration system according to claim 1, wherein a control channel is used both for paging signal from a base station to a mobile station, and the other connection control signal from a mobile station to a base station and from a base station to a mobile station.

5. A location registration system according to claim 1, wherein location registration areas in the same group do not overlap with another location registration area.

6. A location registration system according to claim 1, wherein location registration areas in the same group overlaps partly with another location registration area.

7. A location registration system according to claim 1, wherein said broadcast information construction means is installed in a mobile control center.

8. A location registration system according to claim 1, wherein said broadcast information construction means is installed in a base station.

* * * * *